United States Patent [19]

Naoi et al.

[11] Patent Number: 4,962,426

[45] Date of Patent: Oct. 9, 1990

[54] DYNAMIC NOISE REDUCTION CIRCUIT FOR IMAGE LUMINANCE SIGNAL

[75] Inventors: Nobuaki Naoi, Yokohama; Katunobu Takeda, Kanagawa; Ikuo Yuki, Yokohama, all of Japan

[73] Assignee: Hitachi, Ltd., Tokyo, Japan

[21] Appl. No.: 334,330

[22] Filed: Apr. 7, 1989

[30] Foreign Application Priority Data

Apr. 7, 1988 [JP] Japan .................................. 63-84186

[51] Int. Cl.$^5$ ......................... H04N 5/21; H04N 5/14
[52] U.S. Cl. ..................................... 358/167; 358/166
[58] Field of Search ................... 358/167, 36, 166, 905

[56] References Cited

U.S. PATENT DOCUMENTS

| | | | |
|---|---|---|---|
| 4,437,123 | 3/1984 | Harlan | 358/167 |
| 4,509,080 | 4/1985 | Lagoni | 358/166 |
| 4,520,396 | 5/1985 | Dischert | 358/36 |
| 4,536,796 | 8/1985 | Harlan | 358/167 |
| 4,587,561 | 5/1986 | Kudo | 358/167 |

FOREIGN PATENT DOCUMENTS

| | | |
|---|---|---|
| 122380 | 6/1987 | Japan . |
| 2179820 | 3/1987 | United Kingdom . |

Primary Examiner—Tommy P. Chin
Attorney, Agent, or Firm—Antonelli, Terry, Stout & Kraus

[57] ABSTRACT

A noise reduction circuit comprising: a high-pass filter for extracting the high-frequency component of an image signal; a coring circuit for extracting a faint signal component included in the extracted high-frequency component as noise; a low-pass filter for extracting the low-frequency component of the image signal; an adder for adding the cored high-frequency component and the low-frequency component extracted by the low-pass filter; and a coring control circuit which detects the level of a luminance signal and controls the coring range of the coring circuit according to the level of the luminance signal. Since noise is visually more conspicuous in a dark portion of a picture than in a bright portion of a picture, the coring control circuit increases the coring range when the level of the luminance signal is low, namely, for a dark portion of a picture, and decreases the coring range when the level of the luminance signal is high, namely, for a bright portion of a picture to make noise indistinct over the entire area of a picture plane.

9 Claims, 5 Drawing Sheets

DYNAMIC NOISE REDUCTION CIRCUIT FOR IMAGE LUMINANCE SIGNAL

BACKGROUND OF THE INVENTION

The present invention relates to a noise reduction circuit for use in television receiving equipment to reduce noise included in a luminance signal among television signals.

A noise reduction circuit disclosed in Japanese Patent Laid-open (kokai) No. 62-122380 corresponding to U.K. Pat. No. 2179820 (hereinafter referred to as the cited reference) extracts a high-frequency component including noise from an image signal with a high-pass filter, limits the amplitude of the high-frequency component, inverts the phase of the high-frequency component, and then adds the high-frequency component to the original signal to reduce the noise.

Generally, a circuit as shown in FIG. 1 of the cited reference is designated as a coring circuit. As is known from FIG. 2, which shows the input-output characteristics of the known coring circuit, the output of the coring circuit remains constant for an AC cut input in the range of $\pm \Delta V/2$ with respect to the origin. The coring circuit extracts minute variations from the input signal. The value $\Delta V$ is designated as a coring range.

In FIG. 1 of the cited reference, a circuit comprising an amplitude limiter B, a phase inverter -V and an adder 3 corresponds to the coring circuit.

FIG. 1 shows a conventional noise reduction circuit, which has a low-frequency amplifier in addition to the circuit disclosed in the cited reference. This noise reduction circuit comprises an input terminal $Y_{in}$ to which a luminance signal is applied, a high-pass filter 3 connected to the input terminal $Y_{in}$, a coring circuit 4 connected to the high-pass filter 3, a high-frequency amplifier 5 connected to the coring circuit 4, a low-pass filter 6 connected to the input terminal $Y_{in}$, a low-frequency amplifier 7 connected to the low-pass filter 6, an adder 8 connected to the high-frequency amplifier 5 and the low-frequency amplifier 7, an output buffer 9 connected to the adder 8, and an output terminal $Y_{out}$. A coring gain setting circuit 1 for setting a coring range is connected to the coring circuit 4, and a gain setting circuit 2 is connected to the high-frequency amplifier 5. The high-pass filter 3 filters out the high-frequency signal component of a luminance signal applied to the input terminal $Y_{in}$, and the low-pass filter 6 filters out the low-frequency signal component of the luminance signal. The high-frequency signal component is applied to the coring circuit 4. Suppose that luminance signal as shown in FIG. 3(b) consisting of an original luminance signal as shown in FIG. 3(a) and a noise signal is applied to the input terminal $Y_{in}$. Then, the low-pass filter 6 provides an output signal as shown in FIG. 3(c), while the high-pass filter 3 provides an output signal as shown in FIG. 3(d). Since most noise is a high-frequency signal, the noise signal is included in the output signal of the high-pass filter 3. The coring circuit 4 cores the output signal of the high-pass filter 3 to provide an output signal as shown in FIG. 3(e) obtained by reducing the high-frequency noise signal. Fundamentally, noise signal components outside the coring range $\Delta V$ shown in FIG. 3(d) cannot be cored by the coring circuit 4 and are included in the output signal of the coring circuit 4. However, since such noise signal components are very small, the same are not shown in FIG. 3(e). Since the amplitude of the high-frequency signal component of the input image signal is reduced in coring the same by the coring circuit 4, the high-frequency amplifier 5 amplifies the output signal of the coring circuit 4 to the original level to provide an output signal as shown in FIG. 3(f). The output signal of the high-frequency amplifier 5 is applied to one of the input terminals of the adder 8. On the other hand, the low-frequency signal component as shown in FIG. 3(c) filtered out by the low-pass filter 6 is applied to the other input terminal of the adder 8 after gain adjustment. The adder 8 adds the high-frequency signal component and the low-frequency signal component to provide an output signal as shown in FIG. 3(g) at the output terminal $Y_{out}$.

The coring range $\Delta V$ of the coring circuit 4 is decided uniquely by a setting voltage provided by the coring gain setting circuit 1. When the coring range is increased excessively to increase noise reduction, part of the high-frequency signal component of the input image signal is eliminated to deteriorate the frequency characteristics. On the other hand, when the coring range is decreased excessively, the effect of noise reduction is insufficient.

SUMMARY OF THE INVENTION

Accordingly, it is an object of the present invention to provide a noise reduction circuit which is capable of effectively reducing noise while suppressing the deterioration of the frequency characteristics to a minimum.

A noise reduction circuit in accordance with the present invention comprises a noise reduction circuit, and a noise reduction control circuit for controlling the coring range of the noise reduction circuit. The noise reduction control circuit increases the coring range when the level of a luminance signal is low, namely, increases the coring range for a dark portion of a picture plane, and decreases the coring range when the level of a luminance signal is high, namely, decreases the coring range for a bright portion of a picture plane, to neutralize noise generally over the entire picture plane, because noise is visually more conspicuous in a dark portion of the picture plane than in a bright portion of the picture plane. Thus, a sharp picture is displayed in the bright portion of the picture plane and a picture from which noise has been eliminated is displayed in the dark portion of the picture plane.

The noise reduction circuit of the present invention comprises a coring circuit, and a coring control circuit which detects the level of the luminance signal of an image signal and controls the coring range of the coring circuit according to the level of the luminance signal. The coring control circuit increases the coring range when the level of the luminance signal is low, namely, increases the coring range for a dark portion of an image, and decreases the coring range when the level of the luminance signal is high, namely, decreases the coring range for a bright portion of an image.

DESCRIPTION OF THE PREFERRED EMBODIMENTS

Figure 4:
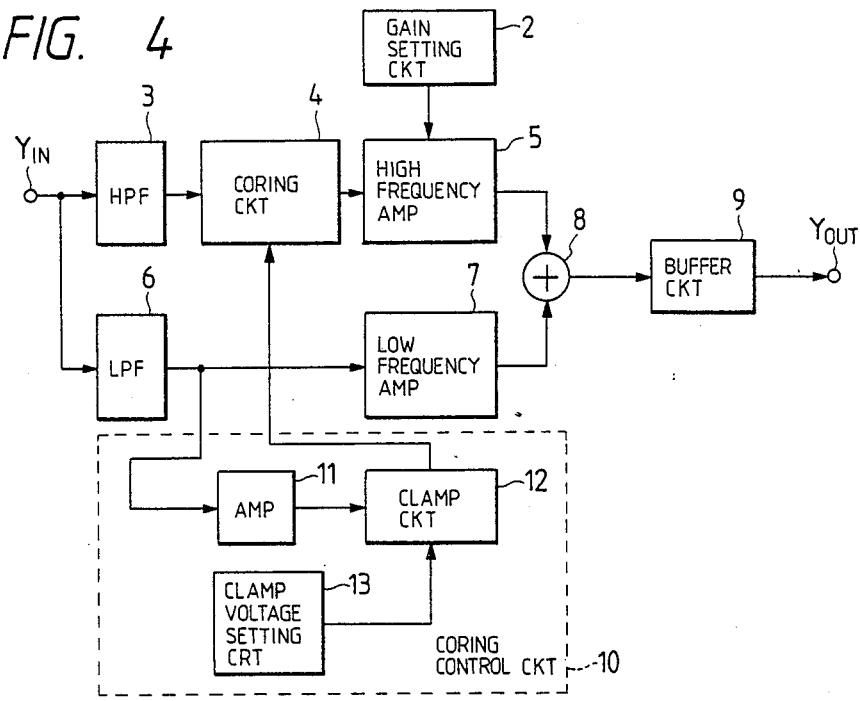
FIG. 4 is a block diagram of a noise reduction circuit in a first embodiment according to the present invention.

FIG. 4 illustrates a noise reduction circuit in an optimum embodiment according to the present invention.

The noise reduction circuit of FIG. 4 includes a coring control circuit 10 instead of the coring gain setting circuit 1 of the conventional noise reduction circuit. The coring control circuit 10 comprises an amplifier 11, a clamping circuit 12 and a clamp voltage setting circuit 13 for setting a clamp voltage. The coring range of a coring circuit 4 of the noise reduction circuit is variable according to a control signal provided by the coring control circuit 10.

Figure 6:
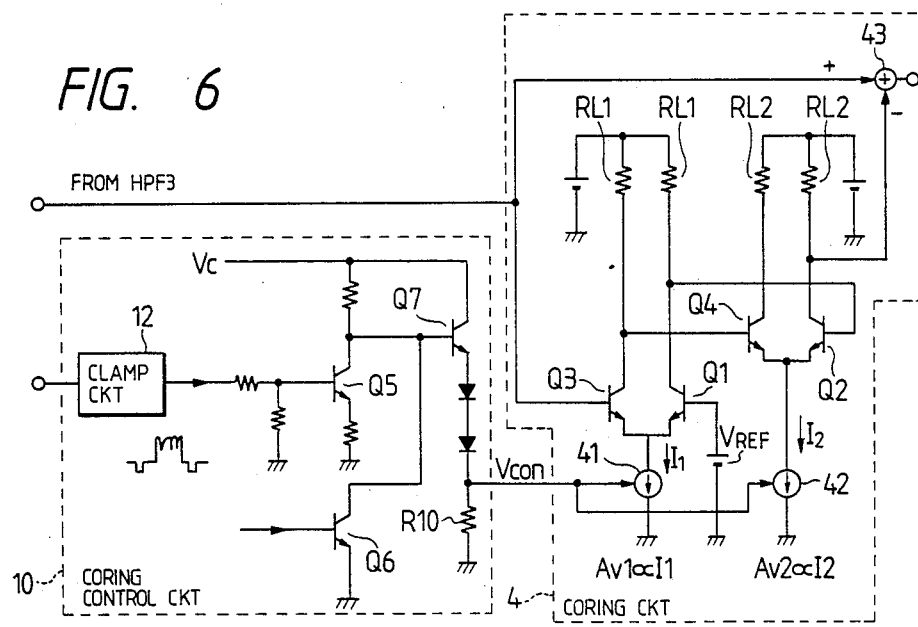
FIG. 6 is a circuit diagram of a coring circuit and a coring control circuit employed in the noise reduction circuit of FIG. 4.

FIG. 6 shows a concrete arrangement of the coring circuit 4 and the coring control circuit 10. The coring circuit 4 comprises a first differential amplifier consisting of transistors Q1 and Q3, and a second differential amplifier consisting of transistors Q2 and Q4. The first and second differential amplifiers are connected respectively to a first constant-current supply 41 and a second constant-current supply 42. The coring control circuit 10 applies a coring control voltage $V_{con}$ to the constant-current supplies 41 and 42, and then the constant-current supplies 41 and 42 supply currents $I_1$ and $I_2$ varying according to the coring control voltage $V_{con}$, respectively.

The output current $I_1$ of the first constant-current supply 41 is expressed by $$I_1 = IB \times I_0/(IB + I_{con}) \quad (1)$$

The output current $I_2$ of the second constant-current supply 42 is expressed by $$I_2 = IB + I_{con} \quad (2)$$

where IB is a bias current, $I_{con}$ is a current variable according to the coring control voltage $V_{con}$, and $I_0$ is a predetermined fixed current.

Since the output voltage $V_{cor}$ of the transistor Q2 is limited to $RL2 \times I_2$, noise voltage signals exceeding $RL2 \times I_2$ included in a signal received from a high-pass filter 3 are clipped by the transistor Q2. Consequently, the collector output signal of the transistor Q2 does not include noise signals of levels exceeding a fixed level. An input signal given to the coring circuit 4 and the collector output voltage $V_{cor}$ of the transistor Q2 are added by an adder 43. Since the phase of the collector output voltage $V_{cor}$ of the transistor Q2 is inverted relative to that of the input signal, the adder 3 provides an output signal obtained by subtracting the collector output voltage $V_{cor}$ from the input signal.

A coring range $V_{cg}$ is expressed by: $V_{cg} = RL2 \times I_2$.

Figure 7:
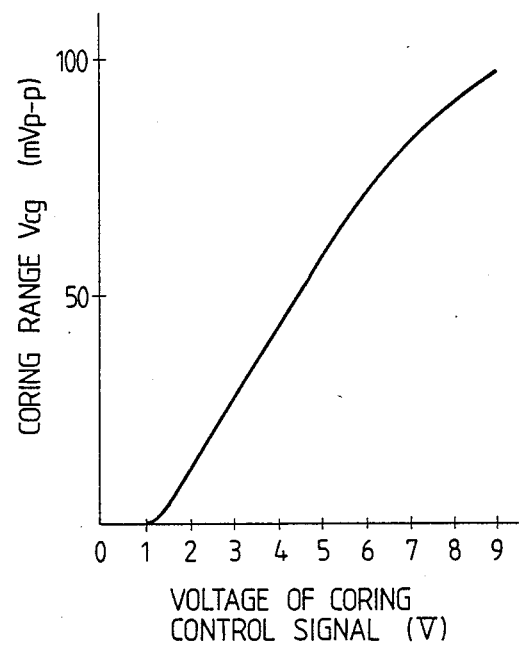
FIG. 7 is a graph showing the relation between coring control voltage and coring range.

The constitution and functions of the coring control circuit 10 will be described hereinafter. A dc regenerated luminance signal is inverted and amplified by a transistor Q5 serving as an inversion amplifier to obtain an inverted luminance signal. The inverted luminance signal is provided through a buffer amplifier Q7. The inverted luminance signal is converted by a resistor R10 into a coring control voltage $V_{con}$, and then the coring control voltage $V_{con}$ is applied to the coring circuit 4. A transistor Q6 is a switch which decides, according to the luminance signal, whether or not noise reduction is to be implemented. When the transistor Q6 is ON, a transistor Q7 is OFF to reduce the coring control voltage $V_{con}$ to zero, so that the coring range becomes zero. When the transistor Q6 is OFF, the transistor Q7 is ON to vary the coring control voltage $V_{con}$ according to the output signal of the transistor Q5, i.e., the luminance signal. Consequently, the coring range varies according to the level of the luminance signal. FIG. 7 shows the relation between the coring control voltage and the coring range. The coring range increases with the increase of the coring control voltage. The coring control voltage is decreased and hence the coring range decreases for a portion of an image signal where the level of the luminance signal is high, namely, a bright portion, and, consequently, the noise reduction effect is reduced. On the contrary, the coring control voltage is increased and hence the coring range is increased for a portion of the image signal where the level of the luminance signal is low, namely, a dark portion, and, consequently, the noise reduction effect is enhanced to display a picture having reduced noise. Generally, in a dark portion of a picture where the level of the luminance signal is low, the SN ratio of the luminance signal is small and noise is visually conspicuous. Accordingly, the noise reduction effect is enhanced for the dark portion of a picture. On the contrary, since the SN ratio of the luminance signal for a bright portion of a picture is large, the noise reduction effect is reduced for the bright portion of a picture. When the noise reduction effect is enhanced for the bright portion of a picture, the correct high-frequency component of the image signal also is reduced to blur the picture.

Figure 1:
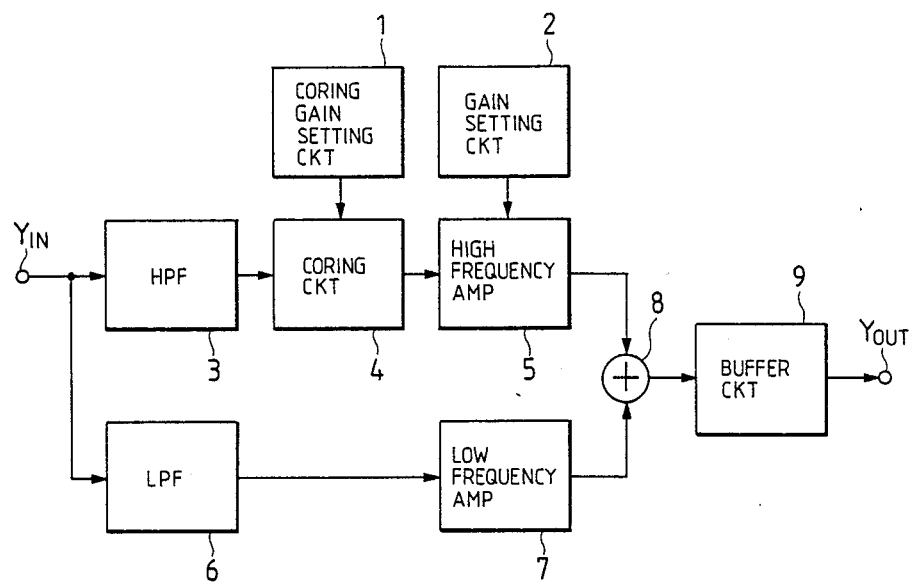
FIG. 1 is a block diagram of a conventional noise reduction circuit.
Figure 2:
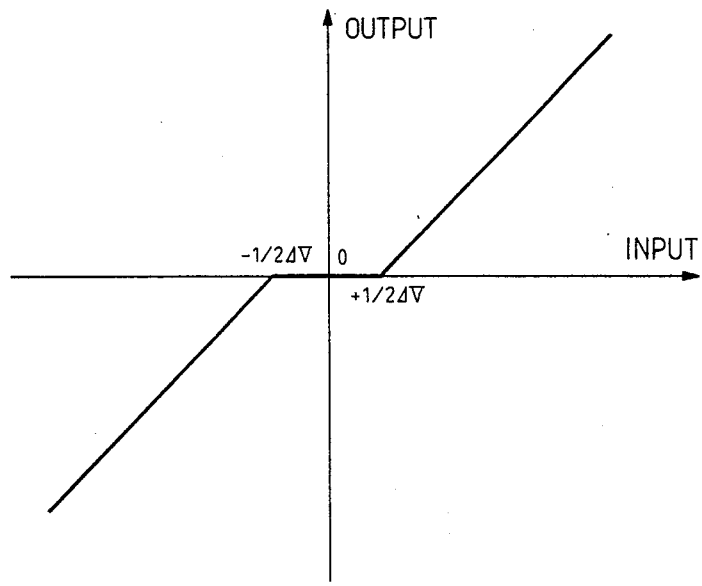
FIG. 2 is a graph showing the input-output characteristics of a coring circuit.
Figure 3:
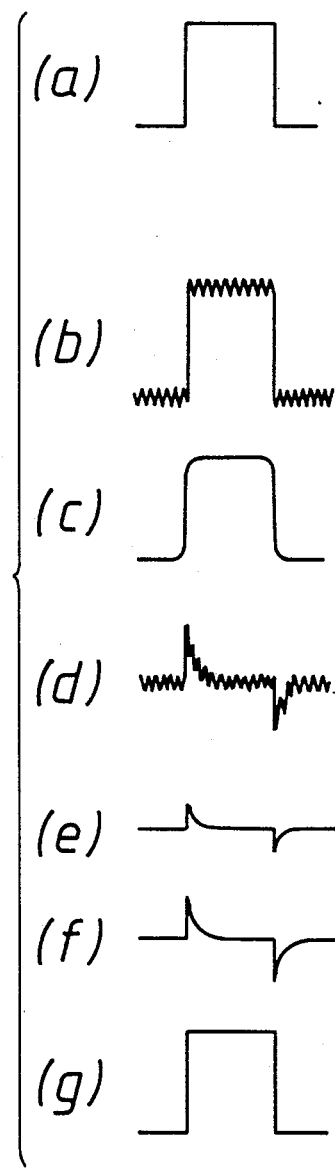
FIG. 3 shows are waveform diagrams showing the waveforms of signals processed by the noise reduction circuit of FIG. 1.
Figure 5:
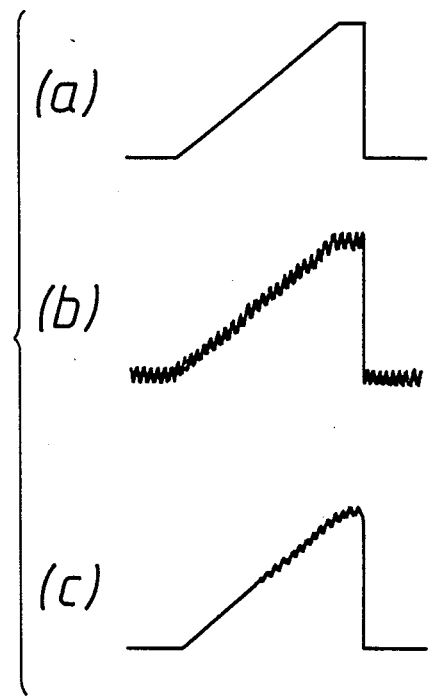
FIG. 5 shonws are waveform diagrams of signals processed by the noise reduction circuit of FIG. 4.

The present invention provides a picture having a sharp image in a bright picture plane and an image eliminating noise in a dark picture plane. FIGS. 5(a), 5(b) and 5(c) show the waveforms of signals processed by the noise reduction circuit of FIG. 4. FIG. 5(a) shows the waveform of an original image signal, FIG. 5(b) shows the waveform of an image signal including a noise signal, and FIG. 5(c) shows the waveform of the output signal of the noise reduction circuit provided at the output terminal $Y_{out}$. As is obvious from the comparative observation of FIGS. 5(b) and 5(c), the noise signal is reduced effectively by the noise reduction circuit.

Figure 8:
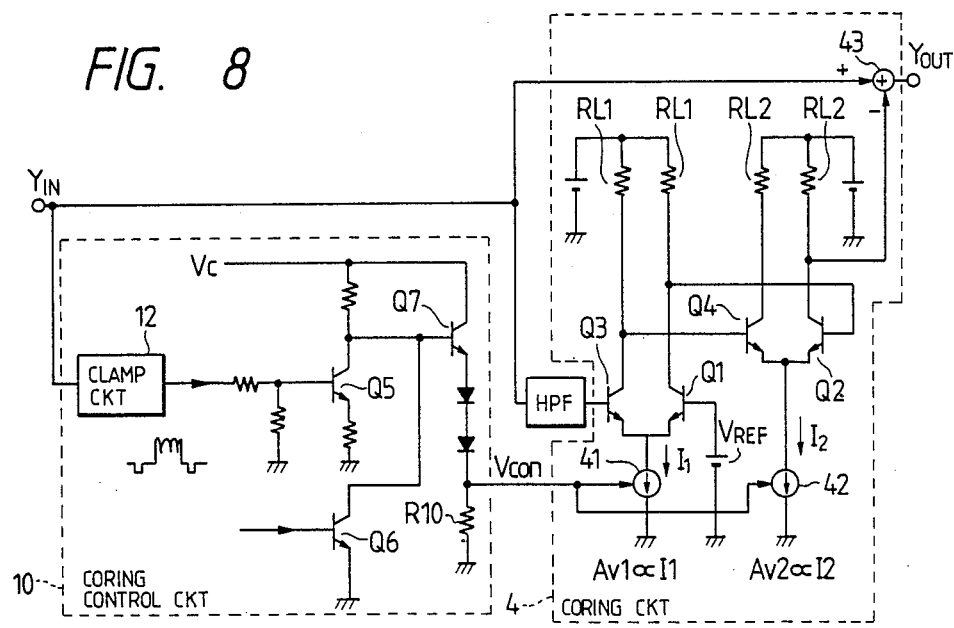
FIG. 8 is a block diagram of a noise reduction circuit in a second embodiment according to the present invention.

FIG. 8 shows a noise reduction circuit in a second embodiment according to the present invention. This noise reduction circuit comprises an input terminal $Y_{in}$ to which a luminance signal is applied, a coring control circuit 10, which is similar to the coring control circuit 10 of the first embodiment shown in FIG. 6, connected to the input terminal $Y_{in}$, a high-pass filter 44 connected to the input terminal $Y_{in}$, a coring circuit 4' connected to the input terminal $Y_{in}$, and an output terminal $Y_{out}$. Whereas band limited signals filtered by the high-pass filter 3 are applied respectively to both the input terminals of the adder 43 of the coring circuit 4 of the noise reduction circuit in the first embodiment shown in FIG.

6, a luminance signal is applied directly to one of the input terminals of an adder 43 of the coring circuit 4' of the noise reduction circuit in the second embodiment shown in FIG. 8. The high-frequency component including noise of the luminance signal filtered out by the high-pass filter 44 is applied to a first differential amplifier consisting of transistors Q1 and Q3 and to a second differential amplifier consisting of transistors Q2 and Q4. Peaks of the high-frequency component of the luminance signal exceeding $RL2 \times I_2$ are clipped by the first and second differential amplifiers, and then the limited high-frequency component is applied to the adder 43. The adder 43 provides a signal obtained by subtracting the output signal of the transistor Q2 from the luminance signal applied to the input terminal $Y_{in}$. Similarly to the coring range in the first embodiment, the coring range of the coring circuit 4' is varied by the coring control circuit 10 according to the voltage level of the luminance signal applied to the input terminal $Y_{in}$.

Thus, the noise reduction circuit in the second embodiment shown in FIG. 8 is able to vary the noise reducing effect according to the level of the luminance signal included in an image signal.

We claim:

1. A noise reduction circuit comprising:
    (1) a signal input terminal through which a luminance signal is received;
    (2) noise reducing means for variably reducing a noise signal component included in a luminance signal applied to the signal input terminal according to a noise reduction control signal, by sampling a low amplitude component from said luminance signal, inverting the low amplitude component, controlling the degree of sampling of the inverted low amplitude component according to the noise reduction control signal and adding the controlled inverted low amplitude component to said luminance signal; and
    (3) a noise reduction control signal generating circuit which detects the level of a luminance signal applied to the image signal input terminal, produces a noise reduction control signal for reducing the noise reducing effect to the noise reducing means when the level of the luminance signal is high, and produces a noise reduction control signal for enhancing the noise reducing effect to the noise reducing means when the level of the luminance signal is low.

2. A noise reduction circuit according to claim 1, wherein said noise reducing means comprises a high-pass filter, and a coring circuit connected to the high-pass filter to extract a signal component of an amplitude level below an amplitude level determined according to the noise reduction control signal from the output signal of the high-pass filter.

3. A noise reduction circuit according to claim 2, wherein said noise reduction control signal generating circuit includes means for detecting the level of the luminance signal included in the image signal applied to the image signal input terminal, and means for applying a noise reduction control signal to reduce the coring range as a noise reduction control signal to said noise reducing means when the level of the luminance is high and for applying a noise reduction control signal to increase the coring range as a noise reduction control signal to said noise reducing means when the level of the luminance is low.

4. A noise reduction circuit according to claim 3 further comprising:
    a low-pass filter which extracts the low-frequency component of the image signal applied to said image signal input terminal; and
    adding means which adds the output signal of the low-pass filter, and the output signal of said coring means, and provides the result of addition as an output signal.

5. A noise reduction circuit according to claim 4, wherein said noise reduction control signal generating circuit detects the level of the output signal of said low-pass filter and applies a signal representing the level of the output signal of said low-pass filter as a noise reduction control signal to said noise reducing means.

6. A noise reduction circuit according to claim 1, wherein the low-frequency component of a signal applied to said signal input terminal is applied to said noise reduction control signal generating circuit.

7. A noise reduction circuit according to claim 1, wherein said noise reduction control signal generating circuit includes a clamping circuit for clamping the luminance signal.

8. A noise reduction circuit comprising:
    (1) a signal input terminal through which a luminance signal is received;
    (2) a high-pass filter which extracts a high-frequency component of the luminance signal applied to the signal input terminal;
    (3) coring means, connected to both the high-pass filter and the signal input terminal, for eliminating from the luminance signal a signal component included in the high-frequency component extracted by the high-pass filter and having an amplitude level below an amplitude level determined according to a coring control signal, by sampling a low amplitude component from said luminance signal, inverting the low amplitude component, controlling the degree of sampling of the inverted low amplitude component according to the noise reduction control signal and adding the controlled inverted low amplitude component to said luminance signal; and
    (4) amplitude control signal generating means for detecting the level of a luminance signal applied to the signal input terminal, and for applying to said coring means a coring control signal which varies with the detected level of said luminance signal.

9. A noise reduction circuit comprising:
    (1) a signal input terminal through which a luminance signal is received;
    (2) a high-pass filter which extracts a high-frequency component of the luminance signal applied to the signal input terminal;
    (3) a coring circuit, connected to the high-pass filter, which extracts from the output signal of the high-pass filter a signal component having an amplitude level below an amplitude level determined according to a coring control signal, by sampling a low amplitude component from said luminance signal, inverting the low amplitude component, controlling the degree of sampling of the inverted low amplitude component according to the noise reduction control signal and adding the controlled inverted low amplitude component to said luminance signal;

(4) a low-pass filter which extracts a low-frequency component of the luminance signal applied to the signal input terminal;

(5) an adding circuit which adds the output signal of the low-pass filter and the output signal of the coring means, and provides an output signal representing the result of addition; and (6) a coring control circuit which detects the level of the luminance signal applied to the signal input terminal, and applies to the coring circuit a signal representing the level of the luminance signal as a coring control signal.

* * * * *